United States Patent [19]

Geisslinger et al.

[11] 4,346,616
[45] Aug. 31, 1982

[54] ELECTROMAGNETICALLY OPERATED FRICTION DISK-FREE CLUTCH

[75] Inventors: Wolfgang Geisslinger; Karel Pustka; Hermann Brönner; Ludwig Müllritter; Gabriel Vondrowski, all of Munich, Fed. Rep. of Germany

[73] Assignee: AGFA-Gevaert AG, Leverkusen, Fed. Rep. of Germany

[21] Appl. No.: 143,304

[22] Filed: Apr. 24, 1980

[30] Foreign Application Priority Data

Apr. 30, 1979 [DE] Fed. Rep. of Germany ........ 2917548

[51] Int. Cl.³ .............................................. F16D 27/10
[52] U.S. Cl. .................................................... 192/84 C
[58] Field of Search ............................ 192/84 A, 84 C

[56] References Cited

U.S. PATENT DOCUMENTS

| | | | |
|---|---|---|---|
| 3,381,784 | 5/1968 | Miller et al. | 192/84 C X |
| 3,530,416 | 9/1970 | Klinkenberg | 192/84 C X |
| 3,703,227 | 11/1972 | Murakami | 192/84 C |
| 3,854,562 | 12/1974 | Wilczewski | 192/84 C |
| 3,876,048 | 4/1975 | Briar | 192/84 C |

Primary Examiner—Allan D. Herrmann
Attorney, Agent, or Firm—Michael J. Striker

[57] ABSTRACT

The electromagnetic disk-free clutch includes a cylindrical rotor supported on one rotary part and defining at one end face a frictional disk and at the other end face an annular groove which accommodates a tubular stator with an electromagnetic coil. The frictional ring of the rotor faces a corresponding frictional ring of a spring-biased armature which is supported for joint rotation and for an axial displacement on the other rotary part. The stator part adjoining the open end of the annular gap is radially extended to form a covering flange having a cross section substantially equal to the cross section of the axially directed parts of the stator and the rotor. The face of the rotor forming the frictional ring is provided with uniformly distributed openings and the axial dimension of the annular groove in the rotor exceeds that of the stator. The resulting air gap between the bottom of the annular groove and the stator prevents the formation of attractive forces acting on the stator in axial direction and the openings in the end portion of the rotor cause a compression of the magnetic flux before it enters the armature.

8 Claims, 1 Drawing Figure

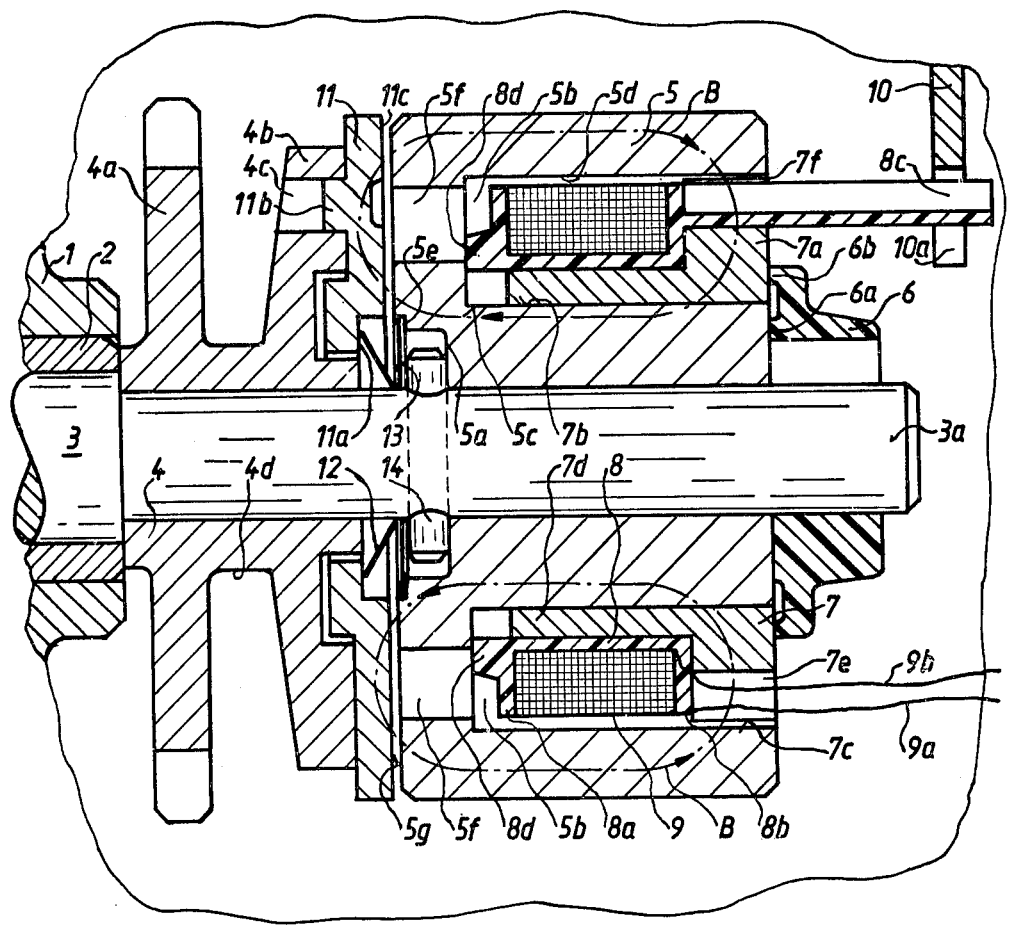

ELECTROMAGNETICALLY OPERATED FRICTION DISK-FREE CLUTCH

BACKGROUND OF THE INVENTION

The present invention relates in general to electromagnetic clutches, and in particular to a electromagnetically operated disk-free clutch of the type having a stationary stator, an electromagnetic coil mounted on the stator, a rotor connected to one rotary part, a magnetic armature supported for joint rotation and for an axial displacement on the second rotary part which is arranged coaxially with the first rotary part, the stator, the rotor and the armature forming together a closed magnetic circuit for the magnetic flux generated by the coil whereby the resulting attractive force causes the engagement of frictional rings provided on the armature and the rotor.

A clutch of this type is disclosed for example in the German published patent application No. 2,628,246. The disadvantage of such prior art clutches, however, is a bulky structure and relatively high production expenditures.

SUMMARY OF THE INVENTION

It is, therefore, a general object of the present invention to overcome the aforementioned disadvantages.

More particularly, it is an object of the invention to provide an improved electromagnetic clutch which can be manufactured at substantially lower costs.

Another object of this invention is to provide such an improved clutch which has a high efficiency at reduced price.

An additional object of the invention is to provide an improved electromagnetic clutch which has a large wear resistance.

In keeping with these objects, and others which will become apparent hereafter, one feature of the invention resides, in an electromagnetically operated clutch of the above-described type, in the provision of a concentric annular groove in the rotor which accommodates a cylindrically shaped stator as well as the magnetic coil which has an annular configuration fitted on the upper surface of the cylindrical stator. The outer face of the cylindrical stator is provided with a radially directed flange which closes the groove whereas the end surface of the rotor which faces the armature and constitutes the friction ring is provided with cutouts communicating with the annular groove so that the magnetic flux flowing around the cutouts and passing across the air gap between the rotor and the armature is condensed. Preferably, the parts of the stator and of the rotor surrounding the magnetic coil are made of a magnetically conductive material having a substantially constant cross section for conducting the magnetic flux and the clearance of the U-shaped annular groove in the rotor corresponds substantially to the width of the radial flange of the stator; the axial dimension of the flange is approximately equal in cross section to the remaining parts of the stator and rotor which conduct the magnetic flux around the magnetic coil; the part of the cylindrical stator which supports the magnetic coil is short a small distance from the bottom of the annular groove and consequently the magnetic flux flowing around the empty bottom portion of the annular groove and the cutouts in the frictional face ring is narrowed down and condensed.

By means of this arrangement and configuration of the rotor and of the stator it is achieved by very simple means that the attractive force of the magnetic flux in the region of the air gap between the frictional faces of the armature and of the rotor is considerably increased and consequently the magnetic coil generating these attractive forces can be reduced in size. The while clutch, therefore, can be reduced in size and at a relatively small current consumption it can develop relatively high coupling moments. The magnetic flux which has a full conductive path in the radial direction and a constricted magnetically conductive path in axial direction exerts only relatively minute axial magnetic forces on the stator so that power loss on the stator occurring during the switching time of the clutch remains low.

From the German published patent application No. 1,613,310, it is in principle known to make certain parts of the electromagnetically operated clutch of compressed ferrite material. Nonetheless, in a particularly advantageous embodiment of this invention both the rotor and the stator are made of the compressed and sintered ferrite material whereby the stator is made of oil saturated sintered iron and the rotor of steam processed sintered iron. The rotor which surrounds the outer cylindrical surfaces of the stator is due to the steam treatment corrosion resistant and its frictional annular surface cooperating with the magnetic armature has an increased resistance. The oil saturated sintered iron of the tubular stator which is accommodated in the aforementioned axially directed annular groove in the rotor body and supports the same for rotation improves the sliding quality between the bearing surfaces of the rotor and the stator and thus permits a maintenance free operation of the clutch over extended periods of time.

In another embodiment of this invention the magnetic coil is wound on a supporting body of a synthetic material which is inserted on the tubular stator and is made preferably by a die casting process. It is also of advantage when the plastic supporting body is diecast with an axially directed projection passing through a recess in the flange of the stator and being capable to engage a locking recess in the frame of the machine employing the clutch and consequently it holds in a very simple manner both the stator and the magnetic coil in a fixed position relative to the machine.

According to still another feature of this invention the plastic coil supporting body is on the face thereof opposite the locking projection provided with an annular spacing projection which overlaps in axial direction the tubular shell of the stator and consequently holds the stator in a fixed axial position in which its inner face is spaced apart from the bottom of the annular groove in the rotor. Due to this spacing projection of the coil supporting body which is formed of a nonmagnetizable plastic material the attraction forces acting between the stator and the rotor in axial direction are substantially reduced and consequently the overall efficiency of the clutch is further improved.

Furthermore, from the manufacturing point of view it is particularly advantageous when the axially displaceable armature is stamped out of a magnetizable material and is formed with at least one embossed guiding portion which is achieved in a corresponding groove in the second rotary part. The rotor is held in a fixed axial position relative to the first rotary part by a clamping collar of a plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates in an axial cross section an embodiment of the electromagnetic disk-free clutch of this invention.

DESCRIPTION OF THE PREFERRED EMBODIMENTS

A side plate 1 of a machine is provided with a bearing bushing 2 supporting for rotation a driving shaft 3 formed with a projecting shaft portion 3a forming a first or driving rotary member and supporting for rotation a second or driven rotary member which in this example, is a sprocket wheel. The sprocket wheel 4 is made of an oil saturated sintered iron which ensures that during a relative motion of the driving shaft 3a and the wheel 4 when the clutch is disengaged, good sliding properties of the bearing surfaces of the two rotary parts are achieved.

The projecting shaft portion 3a is provided with a throughgoing bore in which is inserted a guide pin 14. Both ends of the guide pin 14 project into recesses 5 formed in one end face of a rotor 5 which is thus supported for joint rotation with the driving shaft part 3a. The rotor 5 is made of a magnetizable sintered iron which, for protection against corrosion and wear, is steam treated. The rotor 5 is secured against axial displacement on the shaft part 3a by a commercially available safety clamping collar 6 made of a plastic material.

The other face of the cylindrical rotor 5 is formed with a coaxially arranged annular groove 5b having a substantially U-shaped cross section. A stator 7 in the form of a tubular shell is inserted into the annular groove 5b and is provided with a radial flange 7a which closes the annular groove from the outside. The stator 7 is further dimensioned so that its inner cylindrical surface 7b is shorter in axial direction than the bearing cylindrical surface 5c in the groove of the rotor 5. The maximum radial dimension of the stator 7, that is, the cylindrical surface of the flange 7a is slightly smaller than the clearance of the annular gap 5b so that a certain airgap results between the stator and the rotor. This gap, for the sake of an uninterrupted magnetic flux, should be kept as narrow as possible. The stator 7 similarly as the rotor 5 is made also of a magnetizable sintered iron, whereby in this case the sintered iron is oil saturated to improve the sliding quality of the bearing surface 7b. The cylindrical shell 7d of the stator 7 is fitted into an annular support member 8 of plastic non-magnetizable material. The support member 8 has a trough-shaped cross section for accommodating the electromagnetic coil 9. The coil 9 is wound between the lateral flanges 8a and 8b of the support member and the connection wires 9a and 9b of the coil are guided outwardly through a passage 7e in the flange 7a of the stator. The coil supporting member 8 is diecast with an outwardly projecting locking pin 8c which passes through another passage 7f in the flange 7a of the stator and engages a recess 10a in the frame part 10 of the machine. In this manner both the stator 7 and the coil 9 are secured against angular displacement. The axial displacement toward the open end of the annular groove 5 is prevented by the ring surface 6b of the clamping ring 6 which abuts against the outer face of the axial flange 7a. The axial displacement in opposite direction is prevented by an annular projection 8d formed on the flange 8a of the coil supporting body 8 which in cooperation with the inner surface of the flange 7a keeps the inner face of the coil supporting body 8 at a fixed distance from the bottom of the U-shaped annular groove 5b. As it will be described below, due to the annular spacing between the bottom of the groove 5b and the stator, no effective magnetic attraction forces act on the stator in axial direction when the magnetic coil is energized.

The driven rotary part 4, as mentioned above, is formed with a projecting radial extension 4d which supports for joint rotation and for an axial displacement a disk-shaped armature 11 stamped of a magnetizable sheet metal. The outer face of the armature 11 is provided with an annular recess 11a for accommodating a biasing leaf spring 12 which urges the armature 11 against the extension 4b of the driven rotary part 4. The other end of the biasing spring 12 rests on a brass ring 13 which is inserted in a circular step 5e in the juxtaposed face of the rotor 5. The brass ring 13 thus serves for reducing guiding friction between the biasing spring 12 and the rotor 5 on the one hand and maintains together with the clamping ring 6 a predetermined airgap between the armature 11 and the rotor 5. The armature 11 is coupled to the extension 4b of the driven part 4 by means of stamped out bosses 11b which engage the corresponding recesses 4c in the radial extension 4b. Between the radial extension or flange 4b and the driven sprocket wheel 4 is formed a deep annular groove which prevents lubricating oil applied to the sprocket wheel from propagating on the upper surface of the rotary part 4 and from entering the frictional annular surfaces between the armature and the corresponding face of the rotor.

The frictional face of the rotor 5 facing the armature is formed with cutouts or openings 5f which are distributed over the entire annular face portion of the rotor and are separated from each other by narrow bridges of the magnetizable material. These bridges should be kept as narrow as it is necessary for the rigidity of the frictional surface of the rotor and for safe interconnection of the outer and inner parts of the rotor. The effect of the cutout 5c on the magnetic flux can be achieved also in a known manner by forming the annular portion of the rotor 5 which connects the outer wall of the rotor with the inner wall of a nonmagnetizable material such as for example plastic or glass. The cutouts or openings 5f have the effect that the magnetic flux indicated in the drawing by dash and dot lines B is concentrated in the region of the frictional surface of the rotor 5 and upon crossing the airgap is closed by the armature 11. The concentrated magnetic flux improves the magnetic attraction forces and results in an improved engagement of the armature 11 with the frictional surface 5g of the rotor 5. Except for the aforementioned cutouts 5f, the path of the magnetic flux B is closed by combined magnetically conductive parts of the stator and the rotor having a substantially uniform cross section at all points of the path of the flux around the magnetic coil 9. The long sections of the path of the magnetic flux B extend between the stator and the rotor in axial direction and consequently only radial magnetic forces and axial magnetic forces act between the rotor 5 and the stator 7. The radial air-gap between the inner face of the stator and the bottom of the annular groove in the rotor permits only a very small portion of the magnetic flux to flow therethrough and consequently only negligible magnetic attraction forces act in the axial direction.

It will be understood that each of the elements described above, or two or more together, may also find a useful application in other types of constructions differing from the types described above.

While the invention has been illustrated and described as embodied in a clutch cooperating with coaxially arranged rotary parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetically operated disk-free clutch for coupling two rotary parts, comprising a stator in the form of a hollow cylinder of a magnetizable material, an electromagnetic coil mounted on the outer surface of said stator, a rotor connected to one rotary part and defining at one face thereof a first frictional ring and at the other face thereof an annular groove for accommodating said cylindrical stator, a magnetic armature supported for joint rotation and for an axial displacement on the second rotary part which is arranged coaxially with said first rotary part, said armature defining a second frictional ring facing said first frictional ring on said rotor, means for biasing said armature away from said rotor to form an airgap therebetween, the stator, the rotor and the armature forming together a closed magnetic circuit for the magnetic flux generated by said coil whereby the resulting attractive force axially displaces said armature against the force of said biasing means to engage said two frictional rings, the part of said rotor between said bottom of the annular groove and said first frictional ring being provided with throughgoing cutouts defining narrow bridging wall portions therebetween for concentrating the magnetic flux before entering said armature, and the outwardly directed face of said cylindrical stator being provided with a radial flange covering said annular groove and providing a uniform path for said magnetic flux, said flange having an opening, said electromagnetic coil being wound on a support body of a plastic material, the outer surface of said stator snugly fitting into said support body, said support body being made by a diecasting process and including an outwardly projecting locking pin passing through the opening in said radial flange of said stator body and engaging a corresponding recess in the same for supporting said rotor; said coil supporting body including an inwardly directed annular projection for spacing said stator from the bottom of said annular groove in said rotor, and said rotor and said stator being secured against axial displacement by a clamping ring mounted on the first rotary part and abutting against the outer end faces of said rotor and said stator.

2. A clutch as defined in claim 1, wherein the parts of said stator and said rotor surrounding said electromagnetic coil have together a substantially uniform cross section to define together with said radial stator flange a uniform path for the magnetic flux.

3. A clutch as defined in claim 2, wherein the axial dimension of said radial flange of said stator corresponds substantially to said cross section of the magnetic flux taking place in the cylindrical walls of said rotor and stator which surround said coil.

4. A clutch as defined in claim 1, wherein the axial dimension of said annular groove in said rotor exceeds the axial dimension of said cylindrical stator whereby the gap resulting between the bottom or said groove and the end of said stator conducts a substantially reduced portion of the magnetic flux.

5. A clutch as defined in claim 1, wherein both the rotor and the stator are made of sintered ferrite material.

6. A clutch as defined in claim 5, wherein the stator is made of oil separated sintered iron.

7. A clutch as defined in claim 5, wherein said rotor is made of steam treated sintered iron.

8. A clutch as defined in claim 1, wherein said armature is made by stamping a magnetizable sheet metal and defines at least one guiding projection engaging a corresponding recess in the second rotary part.

* * * * *